US009256479B2

(12) United States Patent
Li et al.

(10) Patent No.: US 9,256,479 B2
(45) Date of Patent: Feb. 9, 2016

(54) APP ICON PROCESSING METHOD AND COMMUNICATION TERMINAL

(75) Inventors: Jun Li, Guangdong (CN); Wu Yuan, Guangdong (CN); Chongyi Pu, Guangdong (CN); Xiang Luo, Guangdong (CN)

(73) Assignee: Yulong Computer Telecommunication Technologies (Shenzhen) Co., Shenzhen (CN)

( * ) Notice: Subject to any disclaimer, the term of this patent is extended or adjusted under 35 U.S.C. 154(b) by 72 days.

(21) Appl. No.: 13/985,946

(22) PCT Filed: Dec. 28, 2011

(86) PCT No.: PCT/CN2011/002205
§ 371 (c)(1),
(2), (4) Date: Oct. 28, 2013

(87) PCT Pub. No.: WO2012/109781
PCT Pub. Date: Aug. 23, 2012

(65) Prior Publication Data
US 2014/0047458 A1 Feb. 13, 2014

(30) Foreign Application Priority Data
Feb. 18, 2011 (CN) .......................... 2011 1 0044611

(51) Int. Cl.
*G06F 9/54* (2006.01)
*H04M 1/725* (2006.01)
*H04W 4/00* (2009.01)
*H04L 29/08* (2006.01)

(52) U.S. Cl.
CPC *G06F 9/54* (2013.01); *H04L 67/34* (2013.01); *H04M 1/72525* (2013.01); *H04W 4/001* (2013.01)

(58) Field of Classification Search
CPC .. H04M 1/72525; H04W 4/001; H04L 67/34; G06F 9/54
See application file for complete search history.

(56) References Cited

U.S. PATENT DOCUMENTS

2003/0100297 A1* 5/2003 Riordan et al. ............... 455/418
2004/0158817 A1* 8/2004 Okachi et al. ................. 717/122
2006/0248069 A1* 11/2006 Qing et al. ......................... 707/4
(Continued)

OTHER PUBLICATIONS

CN102117749A.
(Continued)

*Primary Examiner* — Charles E Anya
(74) *Attorney, Agent, or Firm* — Cesari and McKenna, LLP

(57) ABSTRACT

The present invention relates to the technical field of communications, and provides an app icon processing method and a communication terminal. The processing method comprises the steps of: determining whether or not an existing application is supported by the current operating environment, the current operating environment comprising the current network environment and/or the current terminal environment, etc.; then, inactivating the app icon corresponding to the existing application not supported by the current operating environment, or, downloading and displaying an application supported by the current operating environment. Preferably, the inactivated app icon is removed or displayed in an inactive state. In this way, in the present invention, the app icons of a plurality of inactive applications can be hidden on the communication terminal so that app icons are cleared automatically, thus aiding the user to find quickly the needed and active app icons.

18 Claims, 7 Drawing Sheets

(56) References Cited

U.S. PATENT DOCUMENTS

| | | | | |
|---|---|---|---|---|
| 2007/0016638 | A1* | 1/2007 | Elbury et al. | 709/201 |
| 2007/0169099 | A1* | 7/2007 | Rao et al. | 717/168 |
| 2007/0184823 | A1* | 8/2007 | Okkonen et al. | 455/419 |
| 2008/0301667 | A1* | 12/2008 | Rao et al. | 717/172 |
| 2009/0124251 | A1* | 5/2009 | Niccolini | 455/425 |
| 2010/0262953 | A1* | 10/2010 | Barboni et al. | 717/120 |
| 2011/0296182 | A1* | 12/2011 | Jia et al. | 713/168 |
| 2011/0307354 | A1* | 12/2011 | Erman et al. | 705/27.1 |

OTHER PUBLICATIONS

CN101483689A.
CN101951549A.
CN101137146A.
CN101141689A.
CN101087460A.
International Search Report; filed in the Chinese PCT Application PCT/CN2011/002205, Mar. 13, 2012.

* cited by examiner

APP ICON PROCESSING METHOD AND COMMUNICATION TERMINAL

CROSS REFERENCE TO RELATED APPLICATION

This application claims priority to international application no. PCT/CN2011/002205, filed Dec. 28, 2011. The contents of the prior application are incorporated herein in their entirety.

TECHNICAL FIELD

The present invention relates to the technical field of communications, especially relates to an app icon processing method and a communication terminal.

BACKGROUND OF THE INVENTION

At present, there are more and more applications applicable to communication terminals. Once an application is installed on a communication terminal, it becomes an existing application and an app icon corresponding to the existing application is displayed on the communication terminal. Whether the existing application will or will not be active in the future, the app icon will continue being displayed on the desktop. A lot of desktop space will be taken up therefore and a user, when searching the needed app icon, will be troubled by information clutter, which directly affects the user's efficiency and experience of searching an app icon.

For example, a communication terminal customized according to an operator is usually embedded with various applications customized for the operator, such as eStore for China Telecom, Fetion for China Mobile, and WO 3G for China Unicom, etc. Regardless of whether a user identification card chosen by the user supports the applications customized for the operator or not, all the app icons of the customized applications are displayed on the desktop and thus inactive app icons occupy a lot of positions on the desktop. Wherein:

As for a dual-mode communication terminal working with, for example, a CDMA (Code Division Multiple Access)/GSM (Global System of Mobile communication) network, if the communication terminal is customized for a CDMA network of China Mobile and is embedded with customized applications such as "eStore" and "E-Surfing Payment" while the user is actually using a user identification card for the GSM network, then the app icons customized for China Mobile that are displayed on the desktop of the communication terminal will be useless, thus leaving the desktop cluttered.

As for a dual-mode communication terminal working with, for example, a CDMA/GSM network, if the user has downloaded and installed the "Unicom Mobile" of China Unicom using a user identification card for a GSM network of China Unicom, but later chooses to use a user identification card for a CDMA network of China Telecom, the inactive app icon—"Unicom Mobile"—still will be displayed on the desktop and will take up a portion of the desktop space.

As for a single-mode communication terminal working with, for example, a GSM network, suppose the user has downloaded and installed the "Fetion" app using a user identification card for a GSM network of China Mobile. Once the user chooses to use a user identification card for a GSM network of China Unicom, no doubt the user will waste time finding an active app icon as the inactive app icons e.g. "Fetion" that do not belong to the operator, China Unicom, are still displayed on the desktop.

In view of the foregoing, the existing methods for processing app icons on a communication terminal are obviously inconvenient and defective in actual practice, so it is necessary to make an improvement to them.

SUMMARY OF THE INVENTION

According to the above mentioned defects, it is an object of the present invention to provide an app icon processing method and a communication terminal, which allow the app icons of a plurality of inactive applications to be hidden on the communication terminal so that app icons are cleared automatically, thus aiding the user to find quickly the needed and active app icons.

In order to achieve the aforementioned object, the present invention provides an app icon processing method comprising the steps of:

determining whether or not an existing application is supported by the current operating environment; and inactivating the app icon corresponding to the existing application not supported by the current operating environment, or downloading and displaying an application supported by the current operating environment.

The present invention also provides a communication terminal, comprising:

a supporting and determining module for determining whether or not an existing application is supported by the current operating environment; and a processing module for inactivating the app icon corresponding to the existing application not supported by the current operating environment, or downloading and displaying an application supported by the current operating environment.

In the present invention, it is first determined whether or not an existing application on a communication terminal is supported by the current operating environment, the current operating environment comprising the current network environment and/or the current terminal environment, etc., and then the app icon corresponding to the existing application not supported by the current operating environment is inactivated, for example, the inactivated app icon is removed or displayed in an inactive state while only the app icons of those existing applications supported by the current operating environment are normally displayed. In this way, in the present invention, only the app icons supported by the current operating environment can be displayed and the app icons of a plurality of inactive applications can be hidden on a communication terminal, so that the app icons on the desktop or in the drawer are cleared automatically, thus aiding the user to find quickly the needed and active app icons, shortening the time for finding app icons, and improving the application experience of the user. Further, in the present invention, the applications supported by the current operating environment can also be downloaded and displayed, thus ensuring that the user obtains application information for normal use accurately and quickly.

DETAILED DESCRIPTION OF THE INVENTION

In order to make the object, technical solutions and advantages of the present invention more clearly understood, the present invention will be described in further detail hereinafter in conjunction with the accompanying drawings and examples. It should be understood that the specific embodiments described herein are only used to explain the present invention and are not intended to limit it.

Figure 1:
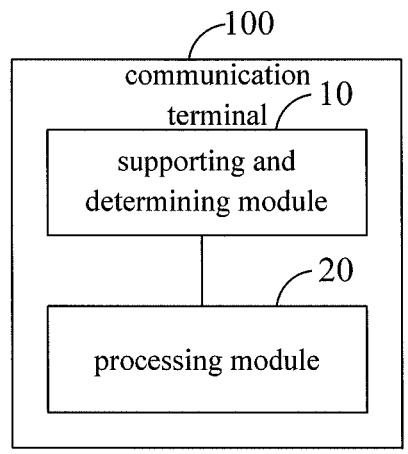
FIG. 1 is a diagram schematically showing the structure of a communication terminal of the present invention.

FIG. 1 shows the structure of a communication terminal of the present invention. The communication terminal 100, which may be a mobile phone, a PDA (Personal Digital Assistant), a tablet PC or the like, at least comprises a supporting and determining module 10 and a processing module 20. Wherein:

The supporting and determining module 10 is configured to determine whether or not an existing application is supported by the current operating environment, and notify the processing module 20 of the result of determination. The current operating environment comprises the current network environment and/or the current terminal environment. The existing applications refer to applications which have been installed on the communication terminal 100, including applications installed by the user by himself/herself or applications customized and installed by an operator.

The processing module 20 is configured to inactivate the app icon corresponding to the existing application not supported by the current operating environment, for example, to remove the unsupported app icon or display it in an inactive state. However, the app icon corresponding to the existing application supported by the current operating environment can be displayed normally, and it needs not be inactivated. After an application is installed on the communication terminal 100, an app icon corresponding to the application will be displayed and the app icon can be displayed on any human-computer interaction interface of the communication terminal 100, e.g. a desktop interface, a drawer interface, a menu interface or the like.

Or, the processing module 20 is configured to download and display an application supported by the current operating environment. Preferably, the supporting and determining module 10 obtains the installation information of an existing application on the communication terminal 100 and, according to the installation information of the existing application on the communication terminal 100, downloads from the network side and displays the changed information of the existing application supported by the current operating environment. The changed information of the existing application includes the information of an uninstalled application, the information of an application to be deleted and/or the information of an updated application. The application can be a custom application or a non-custom application.

Figure 2:
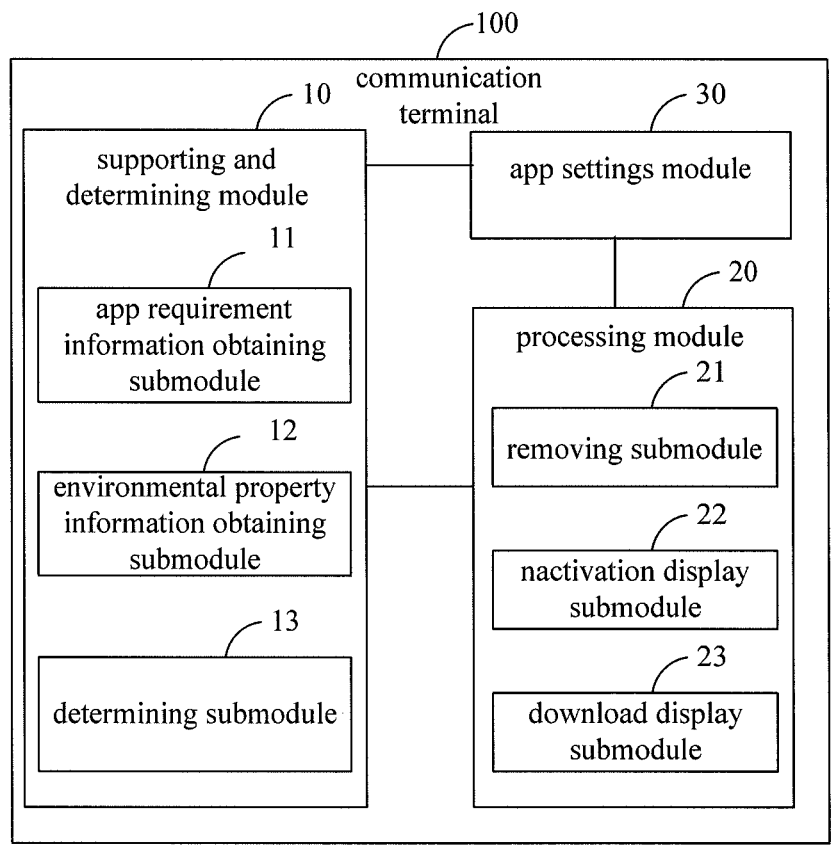
FIG. 2 is a diagram schematically showing the structure of a preferred communication terminal of the present invention.

FIG. 2 is a diagram schematically showing the structure of a preferred communication terminal of the present invention. The communication terminal 100 at least comprises a supporting and determining module 10 and a processing module 20. Wherein:

The supporting and determining module 10 further comprises:

an app requirement information obtaining submodule 11 for obtaining the app requirement information of an existing application, the app requirement information including network requirement information and/or terminal requirement information, etc.;

an environmental property information obtaining submodule 12 for obtaining the environmental property information of the current operating environment, the environmental property information including network property information and/or terminal property information, etc.; and a determining submodule 13 for comparing the app requirement information with the environmental property information to determine whether or not an existing application is supported by the current operating environment.

The processing module 20 further comprises a removing submodule 21, an inactivation display submodule 22 and/or a download display submodule 23:

The removing submodule 21 is configured to remove the app icon corresponding to the existing application not supported by the current operating environment by removing the inactivated app icon but keeping the position thereof, or by removing the inactivated app icon and using a subsequent app icon to refill the position.

The inactivation display submodule 22 is configured to display the app icon corresponding to the existing application not supported by the current operating environment in an inactive state, e.g. disabled, shrunk or labeled, etc.

The download display submodule 23 is configured to download and display an application supported by the current operating environment. The download display submodule 23 can download from the network side and display various applications supported by the current environment.

More preferably, the communication terminal 100 further comprises an app settings module 30 configured to preset and start the intelligent processing application of an app icon. The app settings module 30 provides a settings interface for the user so that the user can set corresponding options thereon and store the settings information in a settings file, which may be an XML (eXtensible Markup Language) file, etc. Specifically, the user can make the following settings by means of the app settings module 30:

1. Whether to start the intelligent processing application of an app icon: the user can choose whether to start this function according to his/her preference. When the user chooses to start it, the app icon of the existing application not supported by the current operating environment will be inactivated. When the user chooses not to start it, the app icon will be processed in the same way as the existing solution, thus ensuring that the user has flexibility and freedom to make a choice.

2. Method of inactivation: the user can choose or self-define a method for inactivating an inactive app icon. Suitable examples of methods of inactivation include but are not limited to:

1) disabling an inactive app icon: when the user chooses this method of inactivation, the app icon of the existing application not supported by the current operating environment is displayed on the desktop in an inoperable state, whereby it is unnecessary for a user to perform an undone action in case of a misoperation;

2) removing an inactive app icon while keeping the position thereof: when the user chooses this method of inactivation, the position where the app icon of the existing application not supported by the current operating environment used to be displayed on the desktop is left vacant; and 3) removing an inactive app icon while using a subsequent app icon to refill the position: a subsequent active app icon refills the position where the app icon of the existing application not supported by the current operating environment used to be displayed on the desktop, etc.

Apparently, the supporting and determining module 10 is the core of the entire system. For one thing, it reads the settings information of the user from the app settings module 30; for another thing, it reads from the communication terminal 100 the app requirement information of the existing applications and the environmental property information of the current operating environment, thus determining the direction of the control flow and of the data flow.

Figure 3:
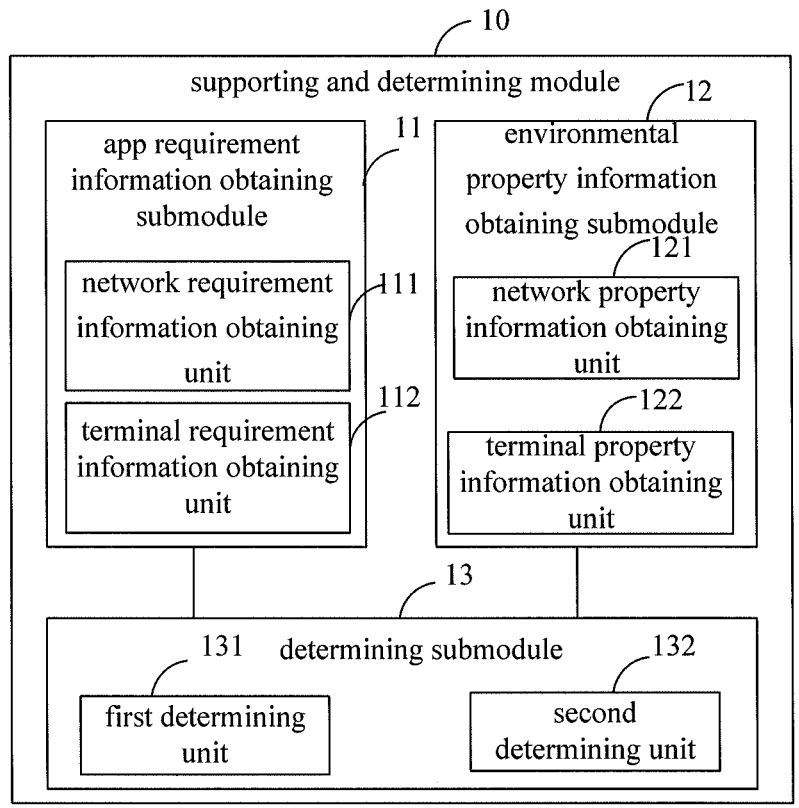
FIG. 3 is a diagram schematically showing the structure of the supporting and determining module of a preferred communication terminal of the present invention.

FIG. 3 is a diagram schematically showing the structure of the supporting and determining module of a preferred communication terminal of the present invention. The supporting and determining module 10 comprises an app requirement information obtaining submodule 11, an environmental property information obtaining submodule 12 and a determining submodule 13. The network requirement information includes network type requirement information and/or network processing capacity requirement information, and the network property information includes network type information and/or network processing capacity information.

The app requirement information obtaining submodule 11 further comprises:

a network requirement information obtaining unit 111 for obtaining the network type requirement information and/or the network processing capacity requirement information of an existing application, wherein the network type requirement information may be a GSM network type, a CDMA network type, and the name of operator, etc., and the network processing capacity requirement information may be theoretical network processing capacity requirement information or the current network processing capacity requirement information.

The environmental property information obtaining submodule 12 further comprises:

a network property information obtaining unit 121 for obtaining the network type information and/or the network processing capacity information of the current network environment, wherein the network type information may be a GSM network type, a CDMA network type, and the name of operator, etc., and the network processing capacity information may be theoretical network processing capacity information or the current network processing capacity information, such as a theoretical network speed or the current network speed.

More preferably, the network property information obtaining unit 121 can also be used for obtaining the network type information of the current network environment by analyzing the network type information relating to the current user identification card. The user identification card can be SIM (Subscriber Identity Module), UIM (User Identity Model) or the like.

The determining submodule 13 further comprises:

a first determining unit 131 for comparing the network type requirement information and/or the network processing capacity requirement information of the existing application with the network type information and/or the network processing capacity information of the current network environment to determine whether or not the existing application is supported by the current network environment.

In the embodiment, the terminal requirement information can include terminal hardware requirement information and/or terminal software requirement information; the terminal property information can include terminal hardware information and/or terminal software information; and the app requirement information obtaining submodule 11 further comprises:

a terminal requirement information obtaining unit 112 for obtaining the terminal hardware requirement information and/or the terminal software requirement information of an existing application, wherein the terminal hardware requirement information includes terminal type requirement information, terminal hardware parameter requirement information, and/or terminal processing capacity requirement information, etc., and the terminal software requirement information includes operating system requirement information and/or assistant software requirement information, etc.

The environmental property information obtaining submodule 12 further comprises:

a terminal property information obtaining unit 122 for obtaining the terminal hardware information and/or the terminal software information of the current terminal environment, wherein the terminal hardware information includes terminal type information, terminal hardware parameter information, and/or terminal processing capacity information, etc., and the terminal software information includes operating system information and/or assistant software information, etc. Furthermore, the terminal type information can be the manufacturer and model of the terminal, etc.; the terminal processing capacity information can be theoretical terminal processing capacity or the current terminal processing capacity, such as the processor of the current terminal and/or the spare values of a memory, and the terminal hardware parameter information can be key hardware parameters, such as the processor, memory and storage of the terminal, etc.; the operating system information can be the name and version of the operating system, etc.; the assistant software information can be the name and version of the assistant software, etc. The assistant software means the relevant software required to run the existing application, e.g. a flash plug-in, a video player, etc.

The determining submodule 13 further comprises:

a second determining unit 132 for comparing the terminal hardware requirement information and/or the terminal software requirement information of the existing application with the terminal hardware information and/or the terminal software information of the current terminal environment to determine whether or not the existing application is supported by the current terminal environment.

In a preferred embodiment, the communication terminal 100 according to the present invention can be a multi- or single-mode communication terminal.

For a multi-mode communication terminal, if the communication terminal is a communication terminal customized for an operator, the app icon of the application customized for the operator will be hidden automatically during desktop display when the user is using a user identification card which is not a user identification card of the operator.

For a multi-mode communication terminal, if the user downloaded and installed an application of a first operator when using a user identification card of the first operator, the app icon corresponding to the downloaded application customized for the first operator will be hidden automatically during desktop display when the user is using a user identification card of a second operator.

For a single-mode communication terminal, if the user is using a user identification card of a first operator, the app icon corresponding to the inactive application of another operator will be hidden automatically during desktop display.

Figure 4:
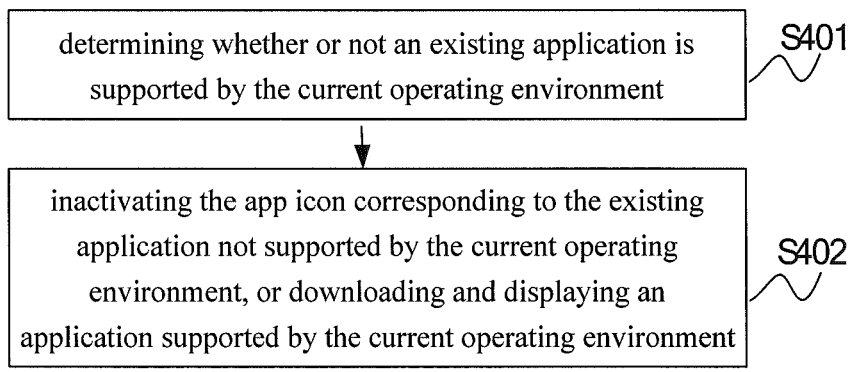
FIG. 4 is a flowchart of an app icon processing method according to the present invention.

FIG. 4 is a flowchart of an app icon processing method according to the present invention. The processing method can be carried out using the communication terminal 100 as shown in FIG. 1 or FIG. 2. The processing method at least comprises the following steps:

Step S401: determining whether or not an existing application is supported by the current operating environment. Said step can be performed using the supporting and determining module 10.

Step S402: inactivating the app icon corresponding to the existing application not supported by the current operating environment, or downloading and displaying an application supported by the current operating environment. Said step can be performed using the processing module 20. The step of inactivating the app icon corresponding to the existing application not supported by the current operating environment can comprise: removing the app icon corresponding to the existing application not supported by the current operating environment; or displaying the app icon corresponding to the existing application not supported by the current operating environment in an inactive state. The step of downloading and displaying an application supported by the current operating environment preferably comprises: obtaining the installation information of an existing application on the communication terminal 100; and, according to the installation information of the existing application on the communication terminal 100, downloading from the network side and displaying the changed information of the existing application supported by the current operating environment. The changed information of the existing application includes the information of an uninstalled application, the information of an application to be deleted and/or the information of an updated application. The application can be a custom application or a non-custom application. In this way, in the present invention, the changed information of applications can be obtained from the network side, thus realizing the uniform installation and management of applications on the network side while ensuring that the user obtains application information for normal use accurately and quickly.

Figure 5:
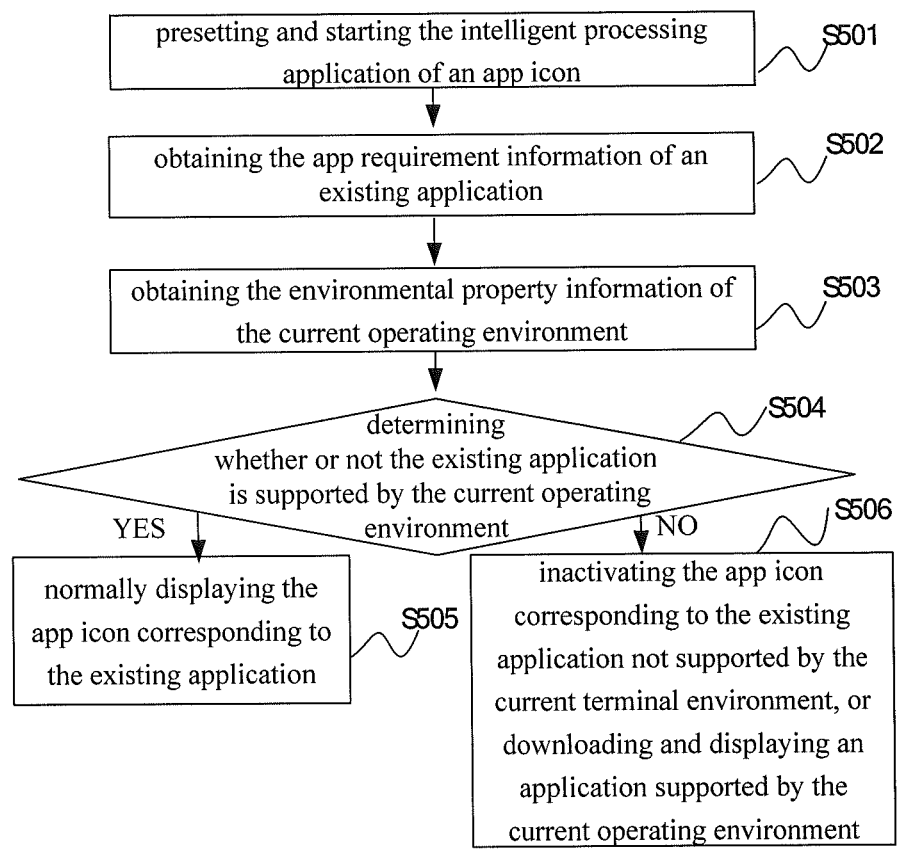
FIG. 5 is a flowchart of a preferred app icon processing method according to the present invention.

FIG. 5 is a flowchart of a preferred app icon processing method according to the present invention. The processing method can be carried out using the communication terminal 100 as shown in FIG. 2. The processing method at least comprises the following steps:

Step S501: presetting and starting the intelligent processing application of an app icon. Said step can be performed using the app settings module 30.

Step S502: obtaining the app requirement information of an existing application. Said step can be performed using the app requirement information obtaining submodule 11. The app requirement information includes network requirement information and/or terminal requirement information, etc.

Step S503: obtaining the environmental property information of the current operating environment. Said step can be performed using the environmental property information obtaining submodule 12. The current operating environment includes the current network environment and/or the current terminal environment, etc. The environmental property information includes network property information and/or terminal property information, etc.

Step S504: comparing the app requirement information with the environmental property information to determine whether or not the existing application is supported by the current operating environment. If the answer is yes, perform Step S505; otherwise, perform Step S506. Step S504 can be performed using the determining submodule 13.

Step S505: if the existing application is supported by the current operating environment, normally displaying the app icon corresponding to the existing application and not inactivating it.

Step S506: if the existing application is not supported by the current operating environment, inactivating the app icon corresponding to the existing application not supported by the current terminal environment, or downloading and displaying an application supported by the current operating environment. For example, the unsupported app icon is removed or displayed in an inactive state. Said step can be performed using the processing module 20.

Figure 6:
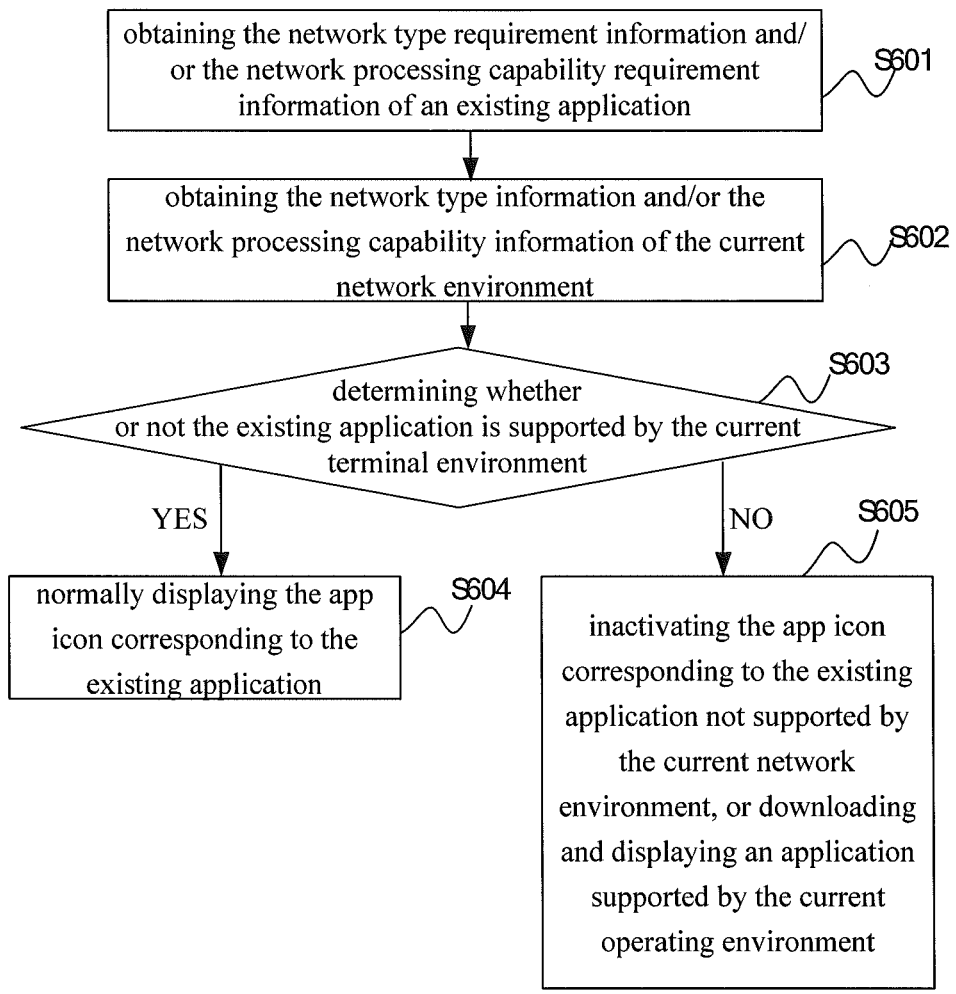
FIG. 6 is a flowchart of an app icon processing method in the first embodiment of the present invention.

FIG. 6 is a flowchart of an app icon processing method in the first embodiment of the present invention. The network requirement information includes network type requirement information and/or network processing capacity requirement information, etc. The network property information includes network type information and/or network processing capacity information, etc. The processing method comprises the following steps:

Step S601: obtaining the network type requirement information and/or the network processing capability requirement information of an existing application. Said step can be performed using the network requirement information obtaining unit 111.

Step S602: obtaining the network type information and/or the network processing capability information of the current network environment. Said step can be performed using the network property information obtaining unit 121.

Step S603: comparing the network type requirement information and/or the network processing capability requirement information of the existing application with the network type information and/or the network processing capability information of the current network environment to determine whether or not the existing application is supported by the current terminal environment. If the answer is yes, perform Step S604; otherwise, perform Step S605. Step S603 can be performed using the first determining unit 131.

Step S604: if the existing application is supported by the current network environment, normally displaying the app icon corresponding to the existing application.

Step S605: if the existing application is not supported by the current network environment, inactivating the app icon corresponding to the existing application not supported by the current network environment, or downloading and displaying an application supported by the current operating environment. For example, the unsupported app icon is removed or displayed in an inactive state. Said step can be performed using the processing module 20.

Figure 7:
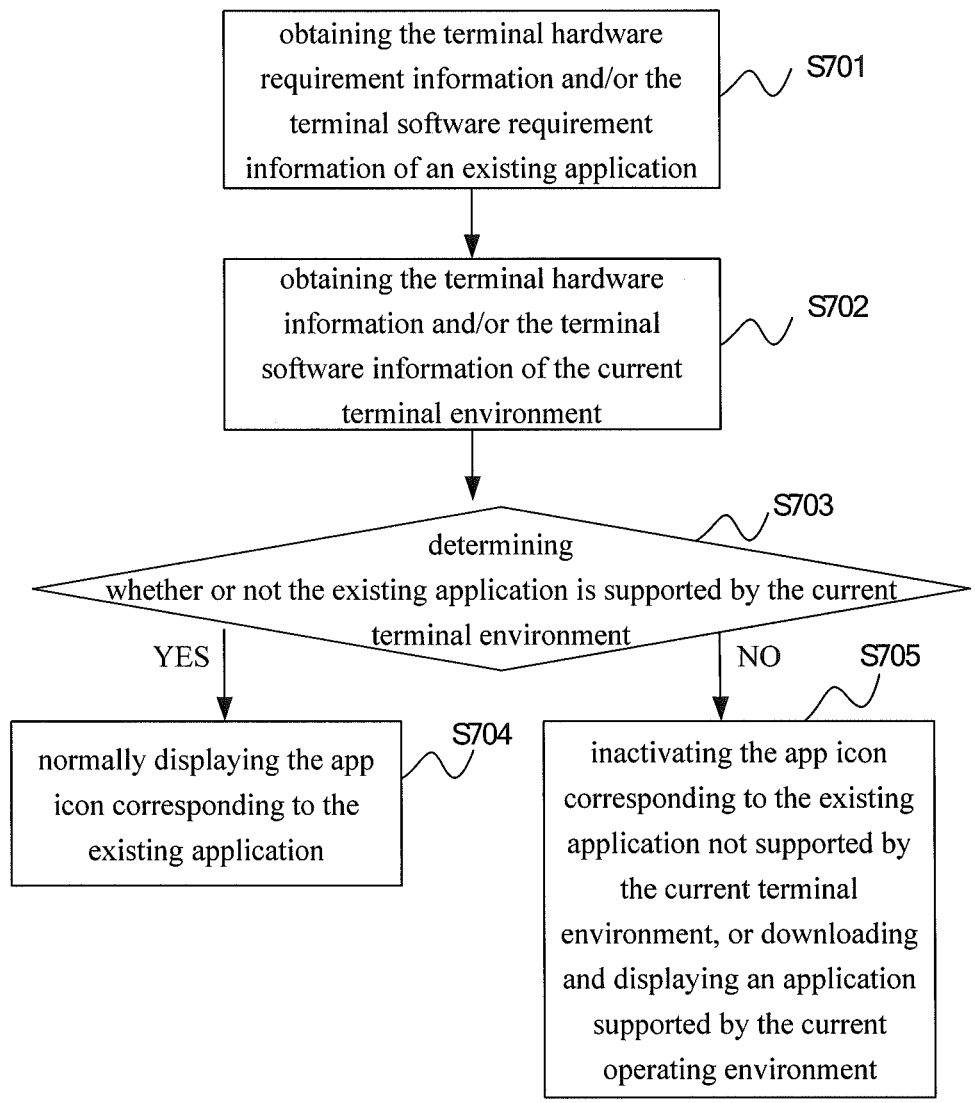
FIG. 7 is a flowchart of an app icon processing method in the second embodiment of the present invention.

FIG. 7 is a flowchart of an app icon processing method in the second embodiment of the present invention. The terminal requirement information includes terminal hardware requirement information and/or terminal software requirement information, etc. The terminal property information includes terminal hardware information and/or terminal software information, etc. The processing method comprises the following steps:

Step S701: obtaining the terminal hardware requirement information and/or the terminal software requirement information of an existing application. Said step can be performed using the terminal requirement information obtaining unit 112.

Step S702: obtaining the terminal hardware information and/or the terminal software information of the current terminal environment. Said step can be performed using the terminal property information obtaining unit 122.

Step S703: comparing the terminal hardware requirement information and/or the terminal software requirement information of the existing application with the terminal hardware information and/or the terminal software information of the current terminal environment to determine whether or not the existing application is supported by the current terminal environment. If the answer is yes, perform Step S704; otherwise, perform Step S705. Step S703 can be performed using the second determining unit 132.

Step S704: if the existing application is supported by the current terminal environment, normally displaying the app icon corresponding to the existing application.

Step S705: if the existing application is not supported by the current terminal environment, inactivating the app icon corresponding to the existing application not supported by the current terminal environment, or downloading and displaying an application supported by the current operating environment. For example, the unsupported app icon is removed or displayed in an inactive state. Said step can be performed using the processing module 20.

Preferably, the terminal hardware requirement information includes terminal type requirement information, terminal hardware parameter requirement information, and/or terminal processing capacity requirement information, etc.; the terminal hardware information includes terminal type information, terminal hardware parameter information, and/or terminal processing capacity information, etc.; the terminal software requirement information includes operating system requirement information and/or assistant software requirement information, etc.; and the terminal software information includes operating system information and/or assistant software information, etc.

Figure 8:
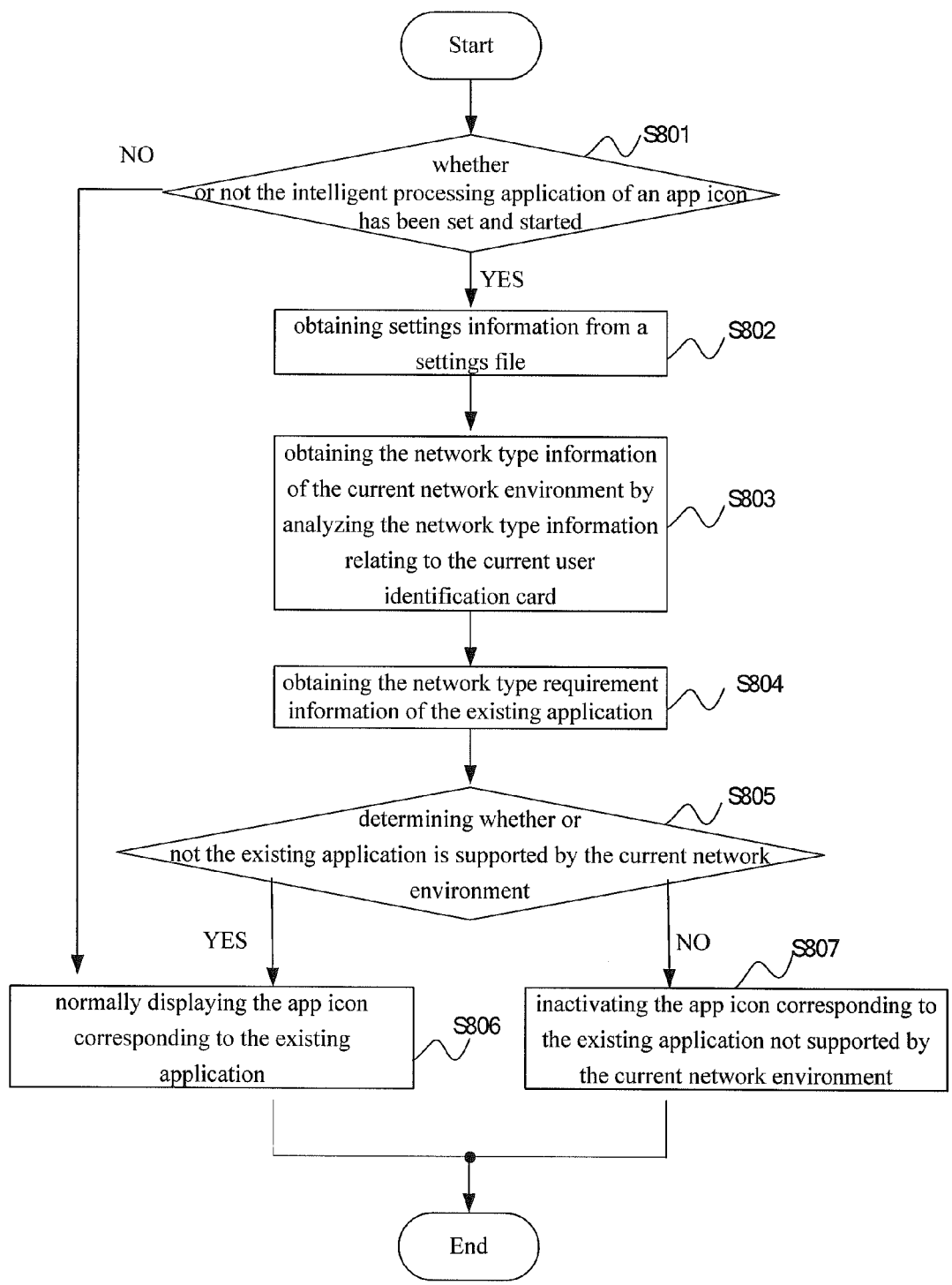
FIG. 8 is a flowchart of an app icon processing method in the third embodiment of the present invention.

FIG. 8 is a flowchart of an app icon processing method in the third embodiment of the present invention. The processing method comprises the following steps:

Step S801: determining whether or not the intelligent processing application of an app icon has been set and started by the user. If the answer is yes, perform Step S802; otherwise, directly jump to Step S806.

Step S802: obtaining settings information from a settings file of the app settings module 30.

Step S803: obtaining the network type information of the current network environment by analyzing the network type information relating to the current user identification card. For example, operator's information, such as the user identification card of China Mobile, the user identification card of China Telecom and the user identification card of China Unicom, can be known from the current user identification card, and said operator's information may correspond to network type information.

Step S804: obtaining the network type requirement information of the existing application. For example, the network type requirement of the existing application may be "applicable only to some network types", "applicable to any network type" or the like.

Step S805: comparing the network type requirement information of the existing application with the network type information of the current network environment to determine whether or not the existing application is supported by the current network environment. If the answer is yes, perform Step S806; otherwise, perform Step S807.

Step S806: normally displaying the app icon corresponding to the existing application.

Step S807: inactivating the app icon corresponding to the existing application not supported by the current network environment. For example, the unsupported app icon is removed or displayed in an inactive state.

Figure 9A:
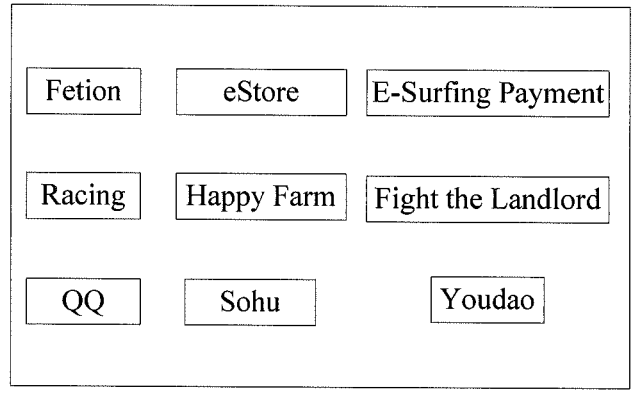
FIGS. 9A to 9C are diagrams schematically showing the display interface of the app icons in the third embodiment of the present invention.
Figure 9B:
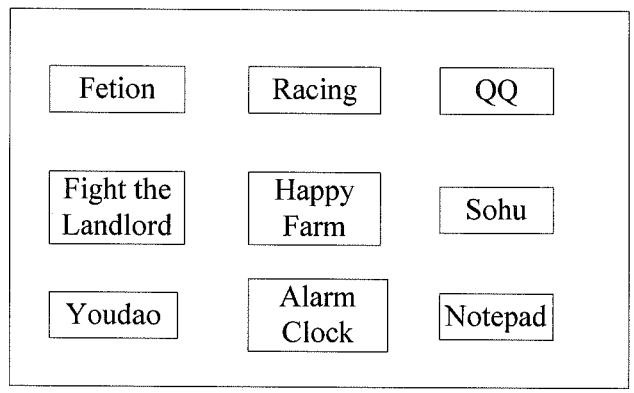
Figure 9C:
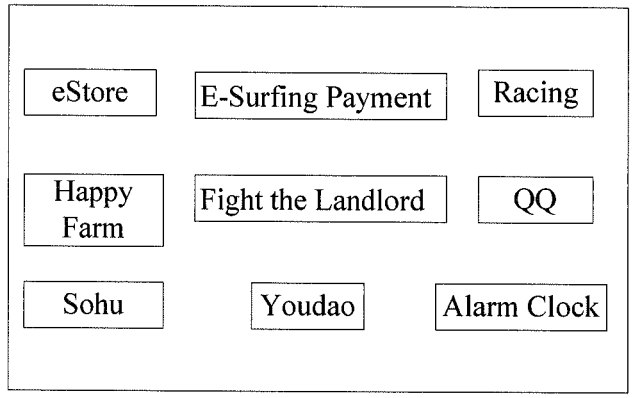

FIGS. 9A to 9C are diagrams schematically showing the display interface of the app icons in the third embodiment of the present invention. Suppose the user is using a dual-mode communication terminal. Then, the user may use in the communication terminal a user identification card for the CDMA network of China Telecom or a user identification card for the GSM network of China Mobile. When the intelligent processing application of an app icon is not started, the app icons of all the existing applications are displayed on the desktop no matter which operator's user identification card is being used by the user currently. As shown in FIG. 9A, not only the app icons of custom applications, such as "eStore" and "E-Surfing Payment", for the CDMA network of China Telecom, but also the app icons of custom applications, such as "Fetion", for the GSM network of China Mobile, are displayed; in other words, a plurality of inactive app icons are displayed on the desktop. If the intelligent processing application of app icons is started and the user is currently using a user identification card for the GSM network of China Mobile, as shown in FIG. 9B, the app icons of the custom applications, such as "eStore" and "E-Surfing Payment", that are not supported by China Mobile, will be removed from the communication terminal 100. On the other hand, if the intelligent processing application of app icons is started and the user is currently using a user identification card for the CDMA network of China Telecom, as shown in FIG. 9C, the app icons of the custom applications, such as "Fetion", that are not supported by China Telecom, will be removed from the communication terminal 100.

To better illustrate the present invention, two other different application scenarios of the present invention are depicted below:

Application Scenario I: A network game application has been installed on a communication terminal. The system automatically obtains the network speed requirement of the network game application, and obtains the current network speed of the network to which the communication terminal is currently connected. If the current network speed fails to meet the network speed requirement of the network game application, the app icon of the network game application will be removed or disabled to avoid that the user unknowingly starts the network game application which, however, cannot run normally, thus avoiding meaningless manual operations and waste of time.

Application Scenario II: A graphic processing application has been installed on a communication terminal. The system automatically obtains the terminal processing capability requirement information of the graphic processing application, and obtains the current terminal processing capability information of the communication terminal. If the current terminal processing capability information is not in line with the terminal processing capability requirement information of the graphic processing application, the app icon of the graphic processing application will be removed or disabled to avoid that the user unknowingly starts the graphic processing application which, however, cannot run normally, thus avoiding meaningless manual operations and waste of time.

In conclusion, in the present invention, it is first determined whether or not an existing application on a communication terminal is supported by the current operating environment, the current operating environment comprising the current network environment and/or the current terminal environment, etc., and then the app icon corresponding to the existing application not supported by the current operating environment is inactivated, for example, the inactivated app icon is removed or displayed in an inactive state while only the app icons of those existing applications supported by the current operating environment are normally displayed. In this way, in the present invention, only the app icons supported by the current operating environment can be displayed and the app icons of a plurality of inactive applications can be hidden on a communication terminal, so that the app icons on the desktop or in the drawer are cleared automatically, thus aiding the user to find quickly the needed and active app icons, shortening the time for finding app icons, and improving the application experience of the user. Further, in the present invention, the applications supported by the current operating environment can also be downloaded and displayed, thus ensuring that the user obtains application information for normal use accurately and quickly.

Of course, many other embodiments of the present invention may be resorted to. Those skilled in the art can make various corresponding changes and variations according to the present invention without departing from the spirit and essence of the present invention, but all the corresponding changes and variations shall fall within the scope of the claims appended to the present invention.

What is claimed is:

1. An application icon processing method comprising:
   obtaining network requirement information of an existing application installed on a communication terminal;
   obtaining network property information of a current network environment by analyzing the network property information relating to a current user identification card;
   comparing the network requirement information of the existing application with the network property information of the current network environment;
   determining, by a processor of the communication terminal, whether the existing application installed on the communication terminal is supported by a current operating environment associated with the communication terminal based on the comparison of the network requirement information with the network property information of the current network environment;
   in response to determining that the existing application installed on the communication terminal is not supported by the current operating environment of the communication terminal based on the comparison indicating that the network requirement information of the existing application is not supported by the network property information of the current network environment, inactivating the application icon corresponding to the existing application that is not supported by the current operating environment of the communication terminal, or downloading and displaying an application supported by the current operating environment of the communication terminal; and
   in response to determining that the existing application installed on the communication terminal is supported by the current operating environment of the communication terminal based on the comparison indicating that the network requirement information of the existing application is supported by the network property information of the current network environment, displaying the application icon corresponding to the existing application in a manner that allow the icon to be selected to execute the existing application.

2. The application icon processing method according to claim 1, wherein determining whether an existing application is supported by the current operating environment of the communication terminal further comprises:
   obtaining application requirement information of the existing application executing on the communication terminal;
   obtaining environmental property information of the current operating environment associated with the communication terminal; and
   comparing the application requirement information with the environmental property information to determine whether the existing application installed on the communication terminal is supported by the current operating environment of the communication terminal.

3. The application icon processing method according to claim 2, wherein inactivating the application icon corresponding to the existing application not supported by the current operating environment, or downloading and displaying the application supported by the current operating environment comprises:
   removing the application icon corresponding to the existing application not supported by the current operating environment, or displaying the application icon corresponding to the existing application not supported by the current operating environment in an inactive state, or downloading and displaying the application supported by the current operating environment.

4. The application icon processing method according to claim 1, wherein the current operating environment includes a current terminal environment of the communication terminal, wherein the application requirement information includes terminal requirement information, and wherein the environmental property information includes terminal property information.

5. The application icon processing method according to claim 4, wherein the network requirement information includes network type requirement information and/or network processing capacity requirement information, wherein the network property information includes network type information and/or network processing capacity information.

6. The application icon processing method according to claim 4, wherein the terminal requirement information includes terminal hardware requirement information and/or terminal software requirement information, wherein the terminal property information includes terminal hardware information and/or terminal software information;
   wherein obtaining the application requirement information of the existing application further comprises obtaining the terminal hardware requirement information and/or the terminal software requirement information of the existing application,
   wherein obtaining the environmental property information of the current operating environment further comprises obtaining the terminal hardware information and/or the terminal software information of the current terminal environment, and
   wherein comparing the application requirement information with the environmental property information to determine whether the existing application is supported by the current operating environment further comprises comparing the terminal hardware requirement information and/or the terminal software requirement information of the existing application with the terminal hardware information and/or the terminal software information of the current terminal environment to determine whether the existing application is supported by the current terminal environment.

7. The application icon processing method according to claim 6, wherein the terminal hardware requirement information includes terminal type requirement information, terminal hardware parameter requirement information, and/or terminal processing capacity requirement information, wherein the terminal hardware information includes terminal type information, terminal hardware parameter information, and/or terminal processing capacity information, wherein the terminal software requirement information includes operating system requirement information and/or assistant software requirement information, and wherein the terminal software information includes operating system information and/or assistant software information.

8. The application icon processing method according to claim 4, wherein inactivating the application icon corresponding to the existing application not supported by the current operating environment, or downloading and displaying the application supported by the current operating environment comprises:
removing the application icon corresponding to the existing application not supported by the current operating environment, or displaying the application icon corresponding to the existing application not supported by the current operating environment in an inactive state; or downloading and displaying the application supported by the current operating environment.

9. The application icon processing method according to claim 1, wherein inactivating the application icon corresponding to the existing application not supported by the current operating environment, or downloading and displaying the application supported by the current operating environment further comprises:
removing the application icon corresponding to the existing application not supported by the current operating environment, or displaying the application icon corresponding to the existing application not supported by the current operating environment in an inactive state, or downloading and displaying the application supported by the current operating environment.

10. The application icon processing method according to claim 1, further comprising
presetting and starting an intelligent processing application of the application icon.

11. A communication terminal comprising:
a processor and a memory, the processor executing one or more modules, the one or more modules including:
a network requirement module configured to obtain network requirement information of an existing application installed on the communication terminal
a network property information module configured to obtain network property information of a current network environment by analyzing the network property information relating to a current user identification card;
comparing the network requirement information of the existing application with the network property information of the current network environment;
a supporting and determining module configured to determine whether an existing application installed on the communication terminal is supported by a current operating environment associated with the communication terminal based on the comparison of the network requirement information of the existing application with the network property information of the current network environment;
a processing module configured to, based on the comparison indicating that the network requirement information of the existing application is not supported by the network property information of the current network environment, inactivate the application icon on a display of the communication terminal corresponding to the existing application or download and display on the display of the communication terminal an application supported by the current operating environment.

12. The communication terminal according to claim 11, wherein the supporting and determining module further comprises:
an application requirement information obtaining submodule configured to obtain application requirement information of the existing application;
an environmental property information obtaining submodule configured to obtain the environmental property information of the current operating environment; and
a determining submodule configured to compare the application requirement information with the environmental property information to determine whether the existing application is supported by the current operating environment.

13. The communication terminal according to claim 12, wherein the current operating environment includes a current terminal environment, wherein the application requirement information includes terminal requirement information, and wherein the environmental property information includes terminal property information.

14. The communication terminal according to claim 13, wherein the terminal requirement information includes terminal hardware requirement information and/or terminal software requirement information, wherein the terminal property information includes terminal hardware information and/or terminal software information,
wherein the application requirement information obtaining submodule further comprises a terminal requirement information obtaining unit configured to obtain the terminal hardware requirement information and/or the terminal software requirement information of the existing application,
wherein the environmental property information obtaining submodule further comprises a terminal property information obtaining unit configured to obtain the terminal hardware information and/or the terminal software information of the current terminal environment, and
wherein the determining submodule further comprises a second determining unit configured to compare the terminal hardware requirement information and/or the terminal software requirement information of the existing application with the terminal hardware information and/or the terminal software information of the current terminal environment to determine whether the existing application is supported by the current terminal environment.

15. The communication terminal according to claim 14, wherein the terminal hardware requirement information includes terminal type requirement information, terminal hardware parameter requirement information, and/or terminal processing capacity requirement information wherein the terminal hardware information includes terminal type information, terminal hardware parameter information, and/or terminal processing capacity information, wherein the terminal software requirement information includes operating system requirement information and/or assistant software requirement information, and wherein the terminal software information includes operating system information and/or assistant software information.

16. The communication terminal according to claim 11, wherein the network requirement information includes network type requirement information and/or network processing capacity requirement information, wherein the network property information includes network type information and/or network processing capacity information.

17. The communication terminal according to claim 11, wherein the processing module comprises:
   a removing submodule configured to remove the application icon corresponding to the existing application not supported by the current operating environment and/or an inactivation display submodule configured to display the application icon corresponding to the existing application not supported by the current operating environment in an inactive state, and/or a download display submodule configured to download and display on the display the application supported by the current operating environment.

18. The communication terminal according to claim 11, wherein the communication terminal further comprises an application settings module configured to preset and start an intelligent processing application of an application icon.

* * * * *